(12) United States Patent
Braun et al.

(10) Patent No.: US 7,397,468 B2
(45) Date of Patent: Jul. 8, 2008

(54) METHOD AND SYSTEM FOR CREATING A DOCUMENT HAVING METADATA

(75) Inventors: John F. Braun, Weston, CT (US); John W. Rojas, Norwalk, CT (US); James R. Norris, Danbury, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 267 days.

(21) Appl. No.: 10/065,282

(22) Filed: Sep. 30, 2002

(65) Prior Publication Data

US 2004/0061690 A1 Apr. 1, 2004

(51) Int. Cl.
*G06F 3/033* (2006.01)
(52) U.S. Cl. .................... 345/179; 345/173; 382/313
(58) Field of Classification Search ................ 345/173, 345/179; 382/313–315
See application file for complete search history.

(56) References Cited

U.S. PATENT DOCUMENTS

| 5,453,762 | A | * | 9/1995 | Ito et al. ................... 345/179 |
| 5,561,446 | A | | 10/1996 | Montlick |
| 5,612,720 | A | * | 3/1997 | Ito et al. ................... 345/179 |
| 5,813,993 | A | * | 9/1998 | Kaplan et al. .............. 600/544 |
| 5,897,648 | A | | 4/1999 | Henderson |
| 5,971,587 | A | | 10/1999 | Kato et al. ............. 364/468.22 |
| 6,050,490 | A | | 4/2000 | Leichner et al. |
| 6,201,903 | B1 | | 3/2001 | Wolff et al. |
| 6,275,745 | B1 | | 8/2001 | Critelli et al. .............. 700/227 |
| 6,285,916 | B1 | | 9/2001 | Kadaba et al. ............. 700/222 |
| 6,330,976 | B1 | | 12/2001 | Dymetman et al. |
| 6,396,598 | B1 | * | 5/2002 | Kashiwagi et al. ........ 358/474 |
| 6,422,474 | B1 | | 7/2002 | Gossweiler, III et al. |
| 6,681,045 | B1 | * | 1/2004 | Lapstun et al. ............. 382/187 |
| 6,773,177 | B2 | * | 8/2004 | Denoue et al. .............. 400/88 |
| 6,795,060 | B2 | * | 9/2004 | Rekimoto et al. .......... 345/173 |
| 6,941,510 | B1 | * | 9/2005 | Ozzie et al. ................ 715/513 |
| 2002/0035687 | A1 | | 3/2002 | Skantze ....................... 713/168 |
| 2002/0065042 | A1 | | 5/2002 | Picoult et al. |
| 2002/0065101 | A1 | | 5/2002 | Picoult et al. |
| 2002/0080386 | A1 | | 6/2002 | Snowdon et al. |

FOREIGN PATENT DOCUMENTS

WO 01/48654 A1 7/2001
WO 02/39378 A1 5/2002

* cited by examiner

*Primary Examiner*—Richard Hjerpe
*Assistant Examiner*—Kimnhung Nguyen
(74) *Attorney, Agent, or Firm*—George M. Macdonald; Angelo N. Chaclas

(57) ABSTRACT

The present application describes systems and methods for creating a document having metadata using a pointing device such as a digital pen. In one configuration, a digital pen captures pen stroke data and processes that data to determine metadata that the pen then writes to metadata storage located on the document.

11 Claims, 2 Drawing Sheets

METHOD AND SYSTEM FOR CREATING A DOCUMENT HAVING METADATA

BACKGROUND OF THE INVENTION

The illustrative embodiments disclosed in the present application are useful in systems including those for creating documents having metadata and more particularly are useful in systems including those for creating documents having metadata using a pointing device such as a digital pen.

Traditional paper based forms are used in many situations. Typically, a form will include pre-printed information and pre-printed boxes for data input. Such a traditional form might be filled in be a salesman in the field. In such a situation, a salesman would fill in some information on the form and send the form to a central processing location by mail or facsimile. The data on the form would typically be scanned or keyed in by an operator.

A user may wish to attach metadata storage to a document such that the attached storage contains data that is in some way related to the document that the storage device is attached to. The storage typically includes an electronic version of the document in addition to the metadata that relates in some way to the information on the document. For example, a user may have an augmented document that is a piece of paper with an rf-id tag attached to it. The user may then write on the document with a pen, scan the document into a computer to create an electronic copy of the written page. The user may then associate some metadata with the electronic copy into the computer and then use a separate tag writer to write the tag. The computer repository then associates the electronic copy with the physical document having the filled rf-id tag. Accordingly, a user must scan the document to create an electronic copy of a document.

A reference entitled Programmable Physical Document is shown in U.S. patent application Publication No. US 2002/0080386 A1, published Jun. 27, 2002 to Snowdon, et al., and is incorporated herein by reference.

SUMMARY OF THE INVENTION

The present application describes illustrative embodiments of systems and methods for processing forms using a digital pointing device. In further illustrative embodiments, a user utilizes a digital pen to associate metadata with a physical document having metadata storage. In a further illustrative embodiment, the digital pen captures stroke data for a document, obtains metadata for the document and facilitates storage of the metadata in the document metadata storage. In another further embodiment, the digital pen stroke data is used to determine metadata and the digital pen stores the metadata in the document metadata storage.

DETAILED DESCRIPTION

Figure 1:
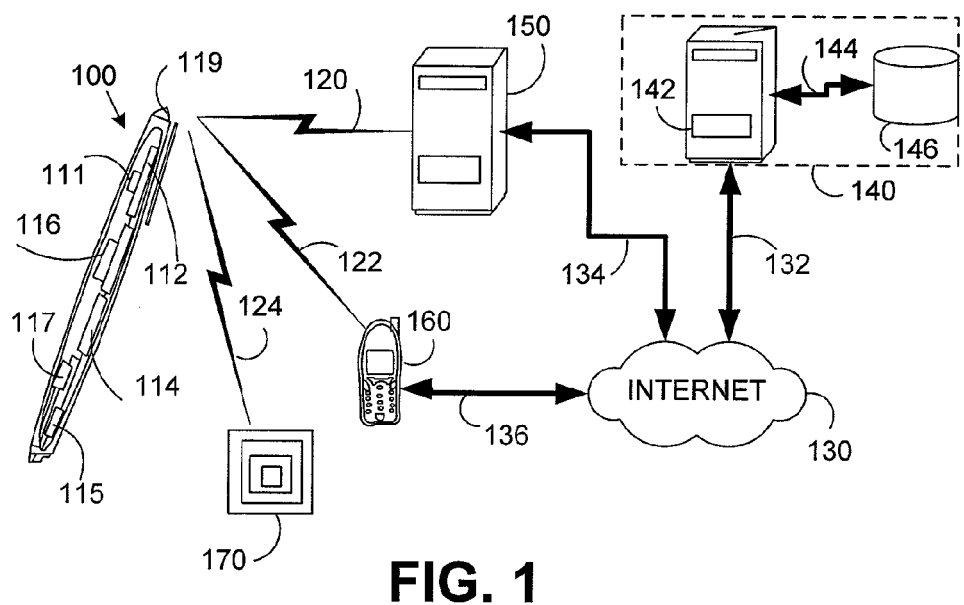
FIG. 1 is a schematic representation of a digital pen system according to an illustrative embodiment of the present application.

A method and system for generating documents is shown. In an illustrative embodiment, a system and method for using a digital pen to input data on a physical media is shown. Metadata may be associated with the paper document and stored into a metadata storage such as an rf-id tag or an integrated circuit attached to the media.

A type of physical document includes media such as paper that is used for writing. Metadata that is associated with a physical document may include an identification code and data that is associated with the physical document and may be relevant to the writing on the document. An augmented document is a physical document such as a piece of paper or spiral bound book that includes storage for metadata. The storage may include an rf-id tag, an integrated circuit or other storage device for storing metadata. An e-copy of a document is an electronic version of a physical document that may contain a rasterized or character based representation of a physical document and may include the metadata associated with the document. Furthermore, other data may also be included in the e-copy such as a Java tool to process the metadata or an authentication data/method. An Informated Document is an augmented document that includes an e-copy having metadata and that is reflected in a database as associating the augmented document and the e-copy.

Digital pointing devices such as the pen and tablet systems available from Wacom Technology Corp. of Vancouver, Wash. allow a user to utilize a computer to capture pen strokes that the user traces over a tablet. Digital pointing devices may utilize capacitive sensors or other grid based sensors to determine absolute or relative position of the pointing device.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen InMotion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen utilizes a Bluetooth transceiver in order to communicate with a processor and the Anoto paper includes a grid encoding information such position information that is detected by the Chatpen. Additional information may be captured including information related to pressure, speed and pen attitude. The additional information includes biometric information that may be used to identify or authenticate a user.

A reference describing a handheld writing device is shown in U.S. Pat. No. 6,050,490, issued Apr. 18, 2000 to Leichner, et al. and is incorporated herein by reference. A reference entitled method and apparatus for wireless remote information retrieval and pen-based data entry is shown in U.S. Pat. No. 5,561,446 issued Oct. 1, 1996 to Montlick and is incorporated herein by reference.

Co-pending U.S. patent application Ser. No. 10/065,281, entitled Method And System For Creating And Sending a Facsimile Using a Digital Pen, filed on even date herewith, is incorporated by reference in its entirety.

Co-pending U.S. patent application Ser. No. 10/065,283, entitled Method And System For identifying a Form Version, filed on even date herewith, is incorporated by reference in its entirety.

Co-pending U.S. patent application Ser. No. 10/065,284, entitled Method And System For Remote Form Completion, filed on even date herewith, is incorporated by reference in its entirety.

Co-pending U.S. patent application Ser. No. 10/065,285, entitled Method And System For Identifying a Paper Form Using a Digital Pen, filed on even date herewith, is incorporated by reference in its entirety.

The Digital Pen

The present application describes systems and methods for composing documents using a pointing device. The illustrative embodiments described herein utilize a Chatpen digital pen in order to compose a document and indicate delivery information for a completed document. However, other sensing devices may be utilized to compose other documents.

The digital pen is utilized to capture information regarding the pen strokes made by a user. The processor includes a micro-controller such as an 8051-based micro-controller or mobile Pentium 4 processor with code to perform the metadata and communications routines.

Toolkits for the development of the processes and stroke data interpretation are known as is processing biometric data including stroke data.

However, other digital pens may also be utilized. Certain digital pens utilize position determination be determining the actual location of the pen on a piece of paper in order to provide a relative location in terms of the location in the space of the piece of paper. Certain digital pens scan the ink as it is applied to digitize a stroke while others sense the stroke using sensors such as pressure sensors, Doppler sensors, accelerometers and other sensing mechanisms.

The illustrative embodiments describe methods and apparatus for capturing pen strokes and for capturing form identification information. The form identification data may include a form serial number, form number and version number. The form identification information may be captured using digital pen stroke data. Additional methods and apparatus for sensing the form version are described. The processes and apparatus described may be implemented using hardware, software or a combination of both. The communications channels may be wireless or wired and may utilize security techniques such as encryption. The data storage and data processors may be locally or remotely located.

The Document Composition System

Referring to FIG. 1, a first illustrative embodiment describing a digital pen system for creating augmented documents is shown.

Digital Pen 100 includes a processor 114, memory 112, ink 117, a camera or image sensor 115, a battery 116 and a wireless transceiver 111. The pen 100 includes an LED 119. It also includes pen stroke data and biometric sensors (not shown). In an alternative, the ink 117 is machine detectable. In another embodiment, the ink is invisible. In an alternative, the pen includes other visual indicators such as an LCD display. In an alternative, the pen includes audio indicators such as a speaker, buzzer or speech synthesizer. In another embodiment other feedback devices such as tactile feedback are provided.

The pen 100 includes a pen tip (not shown) that writes using the ink 117. Writing sensors (not shown) provide data regarding the stroke such as pressure, speed and pen attitude. The pen includes an ink-inhibiting device so that the processor 114 can stop the flow of ink 117. The memory 114 includes a non-volatile memory. The pen 100 includes a real time clock (not shown). Alternatively, a counter may be utilized. The pen 100 utilizes a wireless transceiver 111 that is a Bluetooth™ transceiver. The pen includes an rf-id tag writing subsystem (not shown) that is capable of writing to an active or passive rf-id tag adhered to the document. The rf-id tag is preferable adhered with semi-permanent glue that can be removed with a solvent. Alternatively, other wireless communication channels can be utilized. In another alternative, a wired communications channel such as a docking station may be utilized in addition to or as a replacement for the wireless transceiver.

In another alternative, the pen includes audio input/output including synthesized voice output and voice recognition. Visual output is provided using an LCD display and LEDs and tactile feedback is provided using servomechanisms. Physical input includes an input button.

Bluetooth™ utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

The embodiments described herein may utilize biometric data for purposes including identification and authentication of a user. In another embodiment, the digital pen is a Chatpen digital pen available from Anoto, AB. The pen provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as processor 150. The pen is assigned a unique identification code that is a unique serial number for the pen. In an alternative, the PUID is a Bluetooth™ MAC code or other unique or group assigned code.

The system includes at least one pen 100 that establishes a personal area network using Bluetooth™. The paired device may be a Bluetooth™ router or other processor 150 that connects to the digital pen 100 using wireless connection 120 and provides a gateway using communications connection 134 to the Internet 130. The paired device may include a cellular telephone or PDA 160 that has a Bluetooth connection 122 and a connection 136 to the Internet 130.

Here, the system includes a server 140 that includes storage 146 connected by connection 144 to processor 142. The server 140 is connected to the Internet 130 using communications channel 132. The server hosts a form version database that is periodically downloaded to the pen 100. Alternatively, processor 150 or cellular device 160 includes the form version database (not shown) that can be uploaded to the pen 100. Server 140 or processor 150 may be utilized for other digital pen back end activities including pen stroke data analysis and background pattern lookup services.

Metadata storage device 170 is an rf-id tag that is connected to the digital pen 100 using a wireless communications channel such as Bluetooth. The rf-id tag is a passive tag that uses background rf energy to power the device. Alternatively an active rf-id tag may be used. The pen 110 can read and write data to the metadata storage device 170. Alternatively, storage tag 170 includes a processor.

It is contemplated that all of the connections utilize appropriate security measures. Other well-known input devices, servers, processors, networks and communications mechanisms may be used. A back-end application may be utilized to process pen strokes. The back end application then recognizes command strokes or strokes in command locations identified by the pattern. The data written by a user in a particular data input flied can be rasterized and then subjected to Optical character recognition (OCR) in order to identify the data written by the user.

Processor 150 utilizes a mobile Pentium 4 processor and Windows XP. Alternatively, another platform such as a Sun platform may be used. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the LAN connections lines. Similarly, the other communications channels could be replaced with alternatives. As can be appreciated, various communication flows may be utilized, some of which will be chattier than others.

The present embodiment may alternatively use any pen or stylus like device that provides for electronically recording strokes. Position information may be processed into strokes or transmitted in a separate data stream.

The digital pen 100 approximates the size of a traditional pen and may be used by a user to handwrite information.

Figure 2:
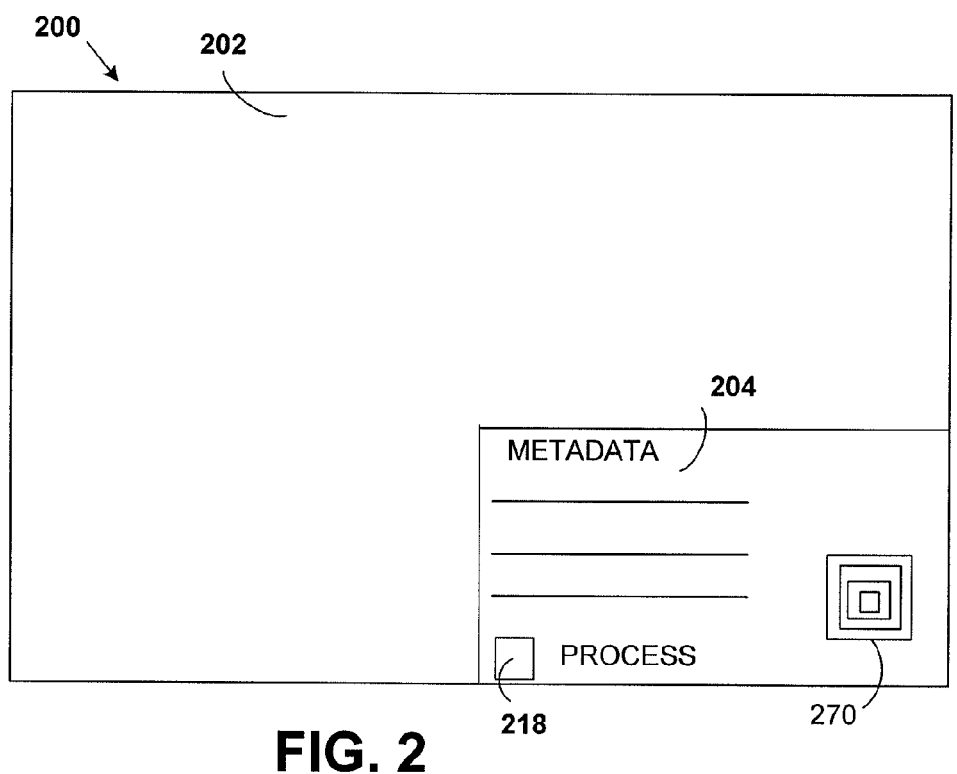
FIG. 2 is a schematic representation of a document having metadata storage according to an illustrative embodiment of the present application.

Referring to FIG. 2, a schematic representation of an augmented document is shown. Document 200 includes an Anoto pattern 202 and includes a metadata input section 204. There is a start process box 218 and a metadata storage device such as an rf-id tag 270. In an alternative, there is no separate metadata input section or process command box. Additionally, the metadata storage device can alternatively be an integrated circuit or other storage device.

Figure 3A:
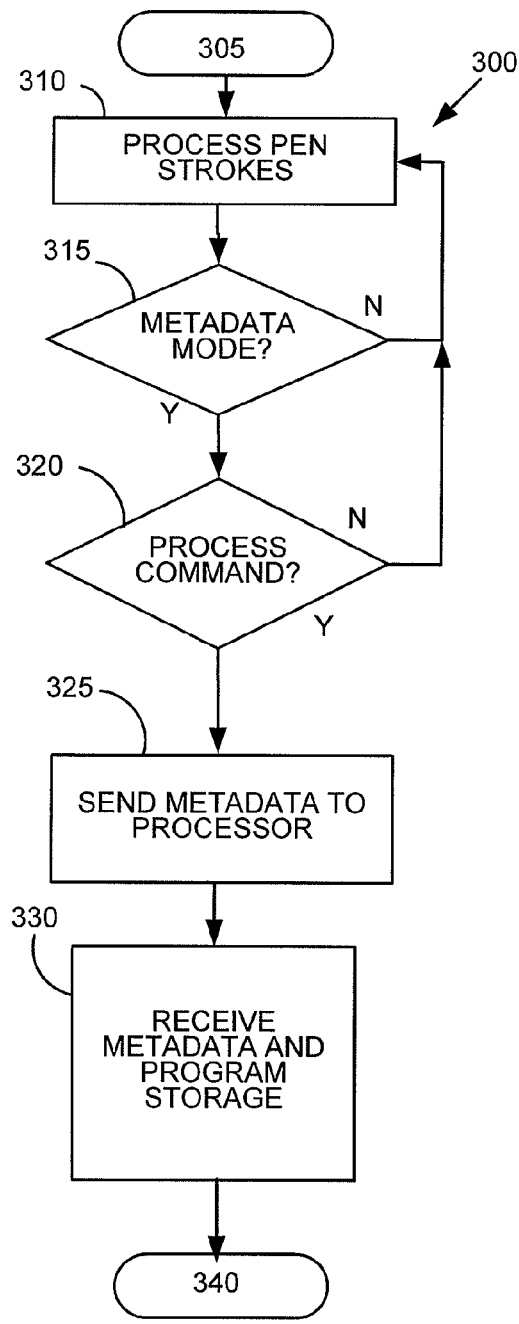
FIG. 3A is a flow chart showing a process for producing an informated document according to the illustrative embodiment of the present application.

Referring to FIG. 3A, flowchart describes the process of producing an Informated Document (InfoDoc).

The process 300 starts in step 305 and proceeds to initialization in step 310 in which the process receives pen strokes. In step 315, the process polls for a metadata mode such as metadata entry strokes. The process proceeds to step 320 to determine if a process command has been entered using process box 218. If so, the metadata entered in step 315 is sent to an external processor 150 in step 325. In step 330 the process receives a metadata message from processor 150 and programs the metadata message into metadata storage device 270. The process then ends in step 340. The metadata exists in two places. First, there is one in the rf-id tag and the second is in the e-copy. The e-copy can be stored either separately or as part of the electronic copy of the physical document if one exists. The two pieces of metadata are not necessarily the same. The storage capacity of the storage device might limit the amount of data that can be stored and the tag could store as little as a unique id number. The metadata may be an e-copy including an electronic copy of the document and the metadata information.

In an alternative, the metadata message is produced in the pen. The processor may be resident in the pen 100 or in an external processor 150, 142 or 160. The Chatpen and Anoto pattern provide location information, but in an alternative, other digital pen devices may be utilized.

In order to create an InfoDoc, the user starts with a blank augmented document. As the user writes onto the augmented document 200, the pen captures what is written on the document in area 202. After the user is done writing the document, the user fills in some metadata fields regarding the document on an area 204 of the document 200 allocated for metadata.

The pen also captures the written metadata. When the user is ready to process the augmented data, the user checks the Process box 218. The pen then sends the written data and metadata to a processor 150 using a wireless communications channel 120. The written data is then either converted to text or imaged. This converted data is considered the electronic document portion of the e-copy. The metadata is converted to text and assigned a unique id such as a serial number. The processor 1 50 sends the e-copy with metadata to a file repository 140. The computer also sends the metadata text back to the pen. The pen 100 includes an rf-id tag writer and when it receives the metadata, it writes the metadata to the tag on the augmented document.

In an alternative, the metadata and electronic version of the document is saved in the tag as an e-copy. An e-copy may contain electronic data for the document such as pen stroke data. Alternatively, an e-copy is an electronic version of the physical document such as a scan of the document or a word file.

Figure 3B:
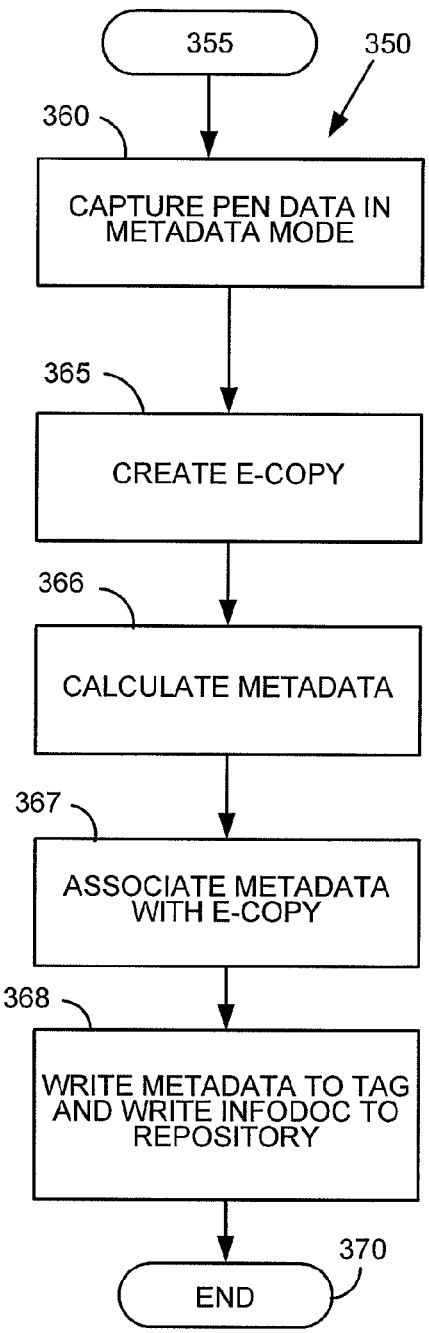
FIG. 3B is a flow chart showing a process for determining and storing metadata according to the illustrative embodiment of the present application.

Referring to FIG. 3B, a process 350 for determining and storing metadata is shown. The process 350 starts in 355 and proceeds to capture pen data in metadata mode step 360. In step 365 the pen digitizes the pen strokes and creates an e-copy of the document in the pen. In step 366, the pen then senses that the document is done, by the use of a signature block, a check box, duration of time or other method and calculates metadata based upon the pen strokes such as the biometric signature of the pen strokes. In step 367 the pen 100 associates the metadata into the e-copy and in step 368, the pen writes the metadata to the tag. The process ends in step 370. In an alternative, the metadata is encrypted according to the biometric data or authentication data.

In another alternative, the process continually updates the metadata and does not sense an end of document indicator. In another alternative, the pen processes input strokes in order to determine if it has enough data to create the biometric signature. The pen then writes the metadata without the e-copy of the document.

Known systems such as C++ or Word and VBA may be utilized. The Anoto toolkit may be utilized. The authentication data may be used to ensure that only authorized users have access to the forms and data. In an alternative applicable to any of the embodiments described, the form processor can use the pen stroke data and pen identification data to determine if the salesman or user has authority to use the particular form, to deal with the particular client, or to sell the particular items requested. If the user is not authorized, the ink supply 117 could be disabled or the pen otherwise disabled.

In another embodiment, the form version indicator is a traceable indicator such as an alphanumeric sequence of characters that the user traces to input form version data. In any of the described embodiments, error indications or messages may be communicated using LED indicators, a display such as an LCD display or audio indications such as beeps or synthesized speech using a speaker. Additionally, tactile feedback may be utilized to indicate an error condition or provide other feedback such as an indication that a form was successfully sent.

In another alternative applicable to any of the embodiments, Wi-Fi enabled wireless systems are utilized and the external processor comprises a Wi-Fi capable hand-held pocket PC such as the Toshiba e740 Pocket PC. Furthermore, differing types of processors and logic systems may be supported.-For example, JAVA based PALM OS devices may be utilized. The message logic, processing logic, security logic, user interface logic, communications logic and other logic could be provided in JAVA format or in a format compatible with individual platforms such as Windows CE and PALM OS. Similarly, other portable computing devices such as laptop computers and tablet computers and wireless capable computers could be utilized. Other platforms such as those using Symbian OS or OS-9 based portable processors could be utilized.

The present application describes illustrative embodiments of a system and method for composing documents using a pointing device and in one embodiment describes a digital pen system for creating a physical document, an e-copy of the document and associating metadata with the document. The metadata is stored in a storage device adhered to the document such as an rf-id tag. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for associating metadata with a document having a metadata dynamic read-write storage device attached to the document comprising:
   initializing a pointing instrument for capturing pen stroke data using the document;
   processing pen stroke data in a normal data capture mode using the document;
   recognizing a metadata mode;
   then capturing pen stroke metadata data using the pointing instrument using the document;
   sending the metadata data to a processor;
   then receiving processed metadata created using the metadata from the processor; and
   then storing the processed metadata in the dynamic read-write metadata storage device that is completely attached to a portion of a surface of the document, wherein the processed metadata includes text data, further comprising:
   receiving a process metadata command, wherein the pointing instrument is a digital pen and wherein a user uses the digital pen and the document to generate the process metadata command; and
   assigning a unique serial number to the metadata, wherein:
   the metadata storage device comprises an rf-id tag and wherein a transceiver within the digital pen is utilized to program the dynamic read-write metadata storage device and wherein the digital pen is brought into proximity of the rf-id tag during the programming.

2. The method of claim 1 wherein the metadata data comprises pen stroke data captured using the digital pen and the document from a predefined area of the document.

3. The method of claim 1 wherein the metadata includes biometric data.

4. The method of claim 1 further comprising storing an e-copy of the document strokes to the metadata storage device.

5. The method of claim 1 wherein the metadata data is pen stroke data captured from a first subset of all pen strokes made on the document.

6. The method of claim 1 wherein the metadata storage device comprises an integrated circuit.

7. The method of claim 1 wherein the document comprises a piece of paper.

8. The method of claim 1 wherein the document comprises a spiral bound book.

9. The method of claim 1 further comprising:
   cryptographically processing the metadata using authentication data.

10. The method of claim 1 further comprising:
    discontinuing capturing metadata data after sufficient data to create a biometric signature is obtained.

11. The method of claim 1, further comprising:
    cryptographically processing the metadata.

* * * * *